United States Patent
Stecher

[15] 3,690,162
[45] Sept. 12, 1972

[54] DEVICE FOR TESTING COMPONENTS WHICH ARE SUBJECTED TO ALTERNATING STRESSES

[72] Inventor: Friedhelm Stecher, Burscheid, Germany

[73] Assignee: Goetzewerke Friedrich Goetze A.G., Burscheid, Germany

[22] Filed: Oct. 9, 1970

[21] Appl. No.: 79,603

[30] Foreign Application Priority Data
Oct. 9, 1969 Germany..........P 19 50 917.2

[52] U.S. Cl......................73/119 R, 73/49.7, 73/91
[51] Int. Cl............................................G01m 15/00
[58] Field of Search..............73/119 R, 47, 49.7, 91; 60/62,6

[56] References Cited

UNITED STATES PATENTS

| | | |
|---|---|---|
| 3,362,215 | 1/1968 | Weinstock.....................73/47 |
| 3,473,371 | 10/1969 | Loeb.............................73/91 |
| 1,686,109 | 10/1928 | Stackey................60/62.6 UX |

*Primary Examiner*—Jerry W. Myracle
*Attorney*—Spencer & Kaye

[57] ABSTRACT

A device having a vibrating assembly driven by a free piston for testing components to be subjected to alternating stresses. A resilient abutment member is arranged adjacent each respective one of the opposed ends of the free piston for abutment thereby in one extreme position of the free piston.

11 Claims, 5 Drawing Figures

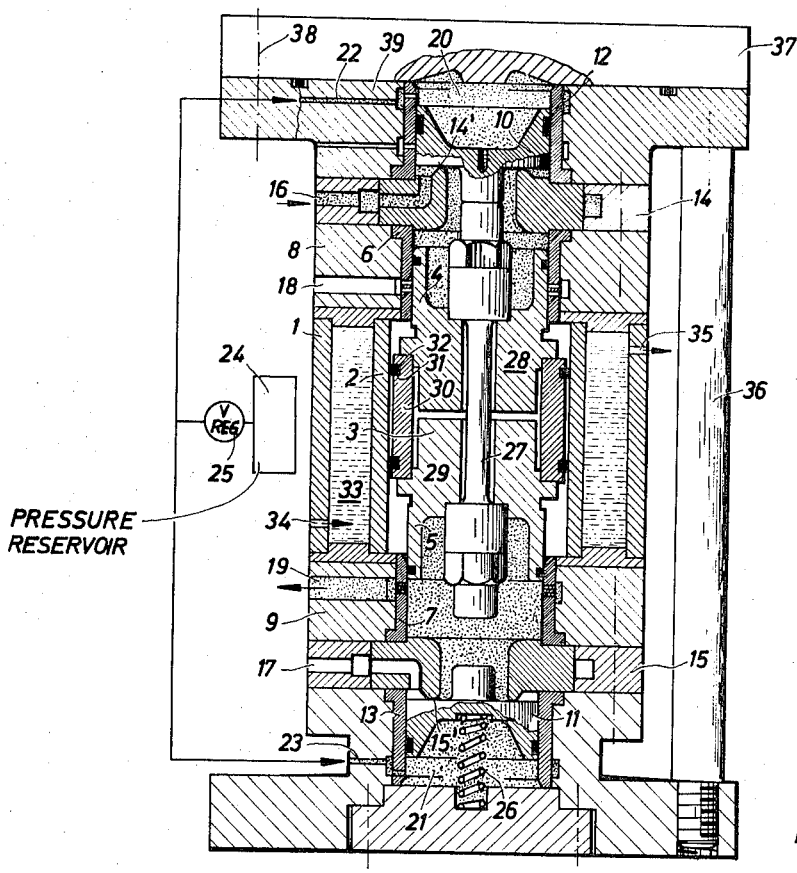
PRESSURE RESERVOIR
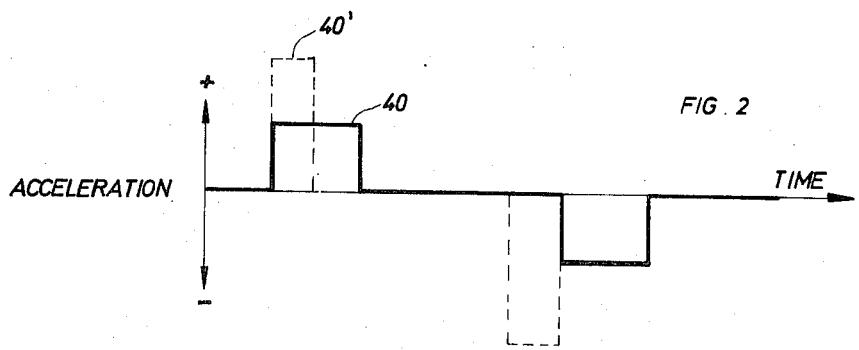
FIG. 2
Inventor
Friedhelm Stecher
By *Greucer & ......*
Attorneys Inventor
Friedhelm Stecher

By Spencer & Kaye

Attorneys

DEVICE FOR TESTING COMPONENTS WHICH ARE SUBJECTED TO ALTERNATING STRESSES

BACKGROUND OF THE INVENTION

The present invention relates to a device for testing components, such as engine components, which are subjected to alternating stresses, particularly piston rings and cylinder head gaskets, the device having a vibratory assembly driven by a free piston.

Piston rings and cylinder head gaskets are subjected to extremely high stresses in internal-combustion engines. Such stresses are of mechanical origin and are due to prestressing, gas pressure and/or acceleration, as well as the thermal stresses produced by the combustion process. The dynamic stresses on the piston rings are produced by the stroke movement of the piston, whereas for cylinder head gaskets the alternating width of the sealing gap between the cylinder head and the motor block represents a type of dynamic stress. The design of engine components which are subjected to continuously alternating stresses requires special testing; in particular, their stability must be tested under conditions which correspond as closely as possible to the operating conditions to be encountered in the engine, since prematurely worn or broken engine components, e.g. piston rings and cylinder head gaskets, require complete dismantling of the engine for the replacement of the parts. Usually the sealing components themselves, as well as those engine parts which cooperate with the sealing components, such as the cylinder head and the cylinder liner, are tested in trial runs with the engine in operation. Such tests are time-consuming and expensive. Moreover, not all the required tests can be performed on a running engine.

Devices have become known for determining the effects of certain stresses on engine components. But no testing devices have been disclosed thus far with which a plurality of types of stresses can be simulated simultaneously and with which it is possible to perform tests which take little time but produce optimum evaluation data.

SUMMARY OF THE INVENTION

It is an object of the present invention to provide a device with which various alternating stresses can be simulated at very high frequencies in order to be able to test an object in a relatively short period of time while obtaining results which correspond to those previously obtained from long-term tests with a running engine. The present invention involves a vibration generator with a free piston which moves back-and-forth in a cylinder, and which is driven either electrically or pneumatically.

According to the present invention, each end of the free piston abuts against a respective resilient abutment. Thus, the momentum of the free piston, which is moved at a given speed against each of the resilient abutments, produces a sudden change in the acceleration or deceleration of the free piston which corresponds approximately to that of a piston ring arranged in the groove of a piston in an internal-combustion engine. In this manner sudden changes in stresses can be produced as they are required for the accomplishment of breaking tests on the rings. Furthermore, the resilient abutments effect an increase in the vibration frequency of the free piston, since they initially absorb the momentum of the piston when it abuts thereon, store it, and transmit it as potential energy to the free piston, after the direction of movement of the piston has been reversed, to augment the normal drive energy. In this way the vibration frequency can be increased four to five times as compared to the prior art piston vibrators. The high vibration frequency substantially reduces the testing period required for continuous stress tests.

As a further feature of a preferred embodiment of the present invention it is proposed to make the resilience property of the resilient abutments adjustable. Thus, alternating load tests can be performed on the sealing components being tested at different frequencies and with different accelerations. This is important for tests approximating operational conditions, because in the internal-combustion engine the engine components are subjected to varying stress frequencies due to changes in the number of revolutions per minute of the engine.

Preferably, the resilient abutments are provided as pistons which, according to their function, are called bounce pistons. The provision of resiliently mounted bounce pistons permits piston ring tests not only at the free piston but also at the bounce pistons themselves, since the latter are subjected to the same acceleration changes and, thus, the same sudden stresses are exerted on the piston rings housed within the bounce pistons.

The resilient mounting of the bounce pistons consists advantageously of pressure-biased gas cushions, so that a change in the gas pressure can influence the elasticity of the cushion. However, it is also conceivable and particularly advantageous for the testing of cylinder head gaskets if one of the bounce pistons rests on a hydraulic cushion. The energy transmitted from the free piston to the bounce piston effects a substantially higher increase in pressure in the hydraulic means than in a gas-filled cushion. Because of the incompressibility of the liquid, the sudden pressure stresses can act directly on the edge of the cylinder-head gasket disposed in the range of the hydraulic cushion so that the explosive pressure increases in an internal-combustion engine can be simulated. In addition, the increase in pressure in the hydraulic cushion resiliently deforms the adjacent components of the device in dependence on their structural and operating design to a greater or lesser degree so that a resilient impact also occurs. It is thus possible to produce bending in the flange of the device as well as warps in the impact piston cylinder which correspond to those of cylinder-heads and cylinder liners in an internal-combustion engine, as well as test their influence on the sealing effect of the cylinder-head gasket to be tested.

According to a further feature of a preferred embodiment of the invention, the bounce pistons are simultaneously designed as control means for driving the free piston, so that after each contact of the free piston on one of the two bounce pistons the means for driving the free piston is reversed in its effective direction. It is in this instance insignificant whether the free piston is driven pneumatically or electrically. With a pneumatic drive the pressurized air is switched directly over the control edges of the bounce piston, whereas with electric drive additional pressurized air switches effect the reversal of the electric field.

To facilitate the starting of a testing device according to the present invention it is proposed to additionally pretension the lower bounce piston of the normally upright device by means of a compression spring in order to eliminate the inherent weight of the lower bounce piston and to bring it into the closing position, because the resilient recoil effect of the gas or hydraulic cushions becomes effective only when the free piston which is already in motion abuts it.

According to a further feature of a preferred embodiment of a testing device according to the present invention, the free piston is provided with an exchangeable ring mount in the form of a cylindrical tube for testing the piston rings. This ring mount is axially clampable between two piston halves of a preferred free piston. Thus, it is possible to test piston rings having different diameters in one device by providing cylindrical tubes which are interchangeable.

A further advantage of the present invention is that the cylinder holding the free piston is preferably constructed as a hollow cylinder so that it can be heated or cooled. The same also applies to the free piston, whose cavity can then be connected with a heating or cooling member via externally connected tubes. It is also possible in this manner to set certain gas pressure conditions at the piston ring sides analogous to those which occur in an internal-combustion engine.

The device according to the present invention in its entirety constitutes a universal testing device particularly for piston rings and cylinder-head gaskets, since it is possible to simulate the different types of stresses to which the sealing components are subjected without the requirement for long-term engine tests. The device, however, can also be used as a simple vibration generator for testing other engine components by being mechanically coupled with the engine components to be tested.

BRIEF DESCRIPTION OF THE DRAWINGS

FIG. 1 is a partly schematic, side elevation, cross sectional view of a testing device according to the present invention.

FIG. 2 is a graph of the acceleration curve of a rebound piston of the device of FIG. 1.

DESCRIPTION OF THE PREFERRED EMBODIMENTS

Figure 3:
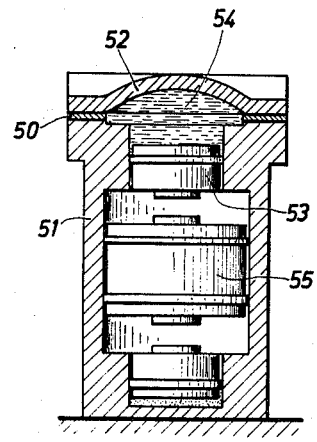
FIG. 3 is a view similar to FIG. 1 of a testing device according to the present invention for testing cylinder-head gaskets.

FIG. 1 shows a testing device according to the present invention in cross section. The device consists of a double-walled hollow cylinder 1, 2 in which a free piston 3 is arranged for up and down movement. The latter is provided at each end with cylindrical guide protrusions 4, 5 which each extend into a respective guide sleeve 6, 7 of the respective annular device portions 8, 9. According to the present invention, an elastic abutment in the form of a resiliently mounted bounce piston 10, 11 is disposed adjacent each respective end of free piston 3. Pistons 10, 11 are guided in respective sleeves 12, 13.

Between the bounce pistons 10, 11 and the free piston 3 lie members 14, 15 defining control edges 14', 15', respectively, for controlling driving air which is fed in through channels 16, 17 and extracted through channels 18, 19. To produce pressure-biased gas cushions 20, 21 behind the bounce pistons 10, 11, respectively, a suitable gas such as nitrogen is fed in through channels 22, 23, respectively. To maintain a constant gas pressure in cushions 10, 11 a pressure reservoir 24 is provided which is disposed outside of the device and has a suitable, known pressure control valve 25. The lower bounce piston 11 is additionally pressed upwardly by a conventional compression spring 26, so that it comes to rest against control edge 15'. This spring 26 is used for starting up the device.

The free piston 3 is preferably constructed of two parts 28, 29 which are axially clamped together by means of a suitable, known stud 27, as well as an exchangeable component carried portion 30 in the form of a cylindrical tube with a plurality of grooves 31 in the outer jacket surface for holding the piston rings 32 which are to be tested. The exchangeable cylinder 1, 2 correspond to the cylinder liner of internal-combustion engines. They can be heated or cooled by cavity 33, depending on whether the tests are to simulate cold or hot engines. The heating or cooling medium is usually water or water vapor which is conducted into and out of cavity 33 through channels 34, 35, respectively.

All the above components of the device of FIG. 1 are clamped together by means of a plurality of suitable, known clamping screws or studs 36 distributed about the periphery of the device, and a cover 37 of the device is separately fastened on a flange 39 of the device by means of a plurality of suitable, known studs, the position of one of which is shown schematically by line 38. Ring and disc-shaped cylinder-head gaskets can be tested between the two components 37 and 39. With appropriate grooves and profiling (not shown) in the cover 37 of the device, it is possible to simulate warps and bends as they predominantly occur in cylinder heads of internal-combustion engines.

The testing device of FIG. 1 operates as follows:

The free piston 3 is driven by means of pressurized air fed in a known manner through channels 16, 17 at about 4 to 6 atmospheres gauge; i.e., it is moved up and down with respect to the orientation of FIG. 1. The respective reversals of the direction of movement of the free piston 3 occur via control edges 14', 15' which the respective bounce piston 10 or 11 lifts off of, or separates from, when piston 3 abuts, it, so that the pressurized air acts on the free piston 3 in a direction opposite to its momentary direction of movement and throws it back. The driving effect of the energy stored in the respective resilient cushion 20, 21 through the respective bounce piston 10, 11 when the free piston 3 abuts is added to this force. Each air channel 18, 19 is opened when the free piston 3 is near a respective end of its stroke so that the driving air can escape again.

The spring 26 is necessary for starting the free piston 3 in motion, since it overcomes the weight of the lower bounce piston 11 and biases it against the control edge 15'. This action makes the pressure in the gas cushion 21 equal to the pressure in the gas cushion 20.

It is significant that the free piston 3 of the testing device of FIG. 1 can be driven by low pressure air or by electromagnetic energy (not shown); the driving energy being required only to overcome the energy losses incurred due to friction. The free piston 3 receives its required acceleration from the resiliently mounted bounce pistons 10, 11. The acceleration curve for the device of FIG. 1 is shown in FIG. 2, where friction losses have not been considered. The solid line 40 represents the acceleration of bounce pistons 10, 11 under a low pressure bias, and the broken line 40' represents the acceleration of bounce pistons 10, 11 under a high pressure bias. In both cases the sudden change in acceleration upon contact of the free piston 3 with either the upper or lower bounce pistons 10, 11, respectively, can be seen. The acceleration values which can be obtained with the device lie at approximately 2,000 G's for frequencies up to approximately 100 Hz. By changing the volume of the cushion behind the bounce pistons 10, 11, it is possible to produce stroke lengths of a few tenths of a millimeter up to about 30 mm, the upper limit being flexible over a wide range which depends on the design and construction of the device.

Figure 4:
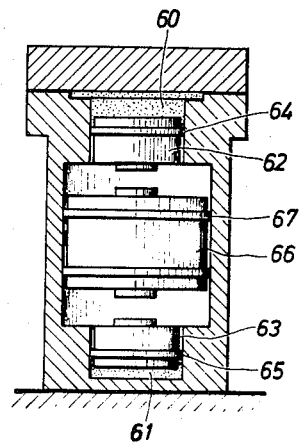
FIG. 4 is a view similar to FIG. 1 of a testing device according to the present invention for testing piston rings.
Figure 5:
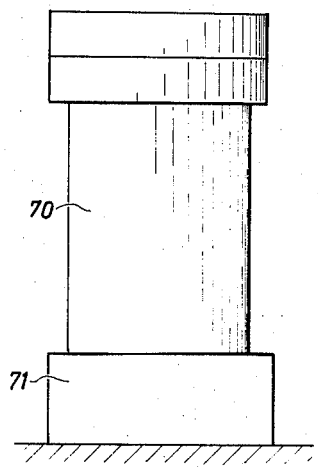
FIG. 5 is a side elevation of a testing device according to the present invention for testing other engine components.

FIGS. 3 to 5 show three typical applications of the testing device according to the present invention.

The device according to FIG. 3 serves particularly for testing cylinder head gaskets. The test object 50 is clamped between the cylinder housing 51, which is shown here in a simplified form, and the cover 52 of the device. The latter is provided with a profile which corresponds approximately to that of the cylinder head of a single-cylinder engine. The upper bounce piston 53 of the device rests on, for example, a constant-volume hydraulic cushion 54. The lower cushion may be either gas or a fluid. When free piston 55 abuts on the bounce piston 53 a sudden increase in pressure occurs in the hydraulic cushion 54, the influence of which on a cylinder head gasket 50, as well as the adjacent components, such as cover 52 and cylinder 51, is measured and evaluated in a known manner.

To measure the deformations due to warping, known mechanical or electrical measuring value receivers are employed.

The testing device shown in FIG. 4 is specifically designed for testing piston rings. Bounce pistons 62, 63 mounted on, for example, gas cushions 60, 61, respectively, as well as a free piston 66 are provided with grooves for holding piston rings 64, 65, 67 for testing. With appropriate selection of frequency, stress and acceleration, it is possible to perform breakage tests, wear tests and, when the device is heated, burn trace tests under conditions similar to those occurring in an engine.

FIG. 5 shows the use of a device according to the present invention as a vibration generator for testing larger engine components subjected to continuous stresses, such as for example the cylinder head or the motor block. For this purpose, a device 70 is mechanically coupled with a test object 71 in any suitable, known manner so that the vibrations which are produced by device 70, as well as sudden stresses, are transferred to the test object 71.

It will be understood that the above description of the present invention is susceptible to various modifications, changes and adaptations, and the same are intended to be comprehended within the meaning and range of equivalents of the appended claims.

I claim:

1. A vibrating device for testing components to be subjected to alternating stresses, comprising, in combination:
   a. a housing having a cylinder therein;
   b. a free piston, with opposed ends, reciprocally mounted within said cylinder for movement between two extreme positions;
   c. a resilient abutment means arranged within said housing adjacent each opposed end of said cylinder for abutment by the respective said opposed ends of said free piston in each extreme position of said free piston; and
   d. drive means associated with said free piston for causing said piston to reciprocate within said cylinder between said two extreme positions, whereby vibrations and hence alternating forces are produced during the acceleration and deceleration of said free piston.

2. A device as defined in claim 1, wherein each of said resilient abutment means has an adjustable resiliency property.

3. A device as defined in claim 2, wherein each said resilient abutment means is a bounce piston.

4. A device as defined in claim 3, wherein said drive means includes passageways opening into said cylinder adjacent said bounce pistons through which a fluid under pressure can flow against the respective opposed ends of said piston to move it between its two extreme positions, said bounce pistons controlling the passage of fluid through said passageways.

5. A device as defined in claim 4, further including spring means for biasing one of said bounce pistons toward said free piston.

6. A device as defined in claim 5, further comprising a cylindrical tube, which serves as an exchangeable component carrier, mounted on the surface of said free piston.

7. A device as defined in claim 6, wherein said cylinder is a double walled cylinder.

8. A device as defined in claim 7, wherein said double walled cylinder is adapted to receive a fluid so that said free piston can be heated and cooled.

9. A device as defined in claim 8, wherein at least one of said bounce pistons is arranged on a pressure-biased gas cushion.

10. A device as defined in claim 8, wherein at least one of said bounce pistons is arranged on a hydraulic cushion.

11. A vibrating device as defined in claim 1, further comprising component support means for supporting a component within said housing so as to subject a component carried in said support means to forces produced during the acceleration and deceleration of said free piston.

* * * * *